United States Patent [19]
Kojima

[11] Patent Number: 5,958,163
[45] Date of Patent: Sep. 28, 1999

[54] PNEUMATIC RADIAL TIRE WITH SPECIFIED BEAD REINFORCING LAYER

[75] Inventor: Teruhiko Kojima, Saitama, Japan

[73] Assignee: Bridgestone Corporation, Tokyo, Japan

[21] Appl. No.: 08/862,991

[22] Filed: May 27, 1997

[30] Foreign Application Priority Data

May 30, 1996 [JP] Japan .................................. 8-136920
Mar. 10, 1997 [JP] Japan .................................. 9-054525

[51] Int. Cl.$^6$ ............................ B60C 15/00; B60C 15/06
[52] U.S. Cl. .......................... 152/542; 152/539; 152/546; 152/547
[58] Field of Search .................... 152/539, 542, 152/543, 546, 547

[56] References Cited

U.S. PATENT DOCUMENTS

| 5,117,888 | 6/1992 | Shimizu | 152/546 X |
| 5,164,029 | 11/1992 | Oohashi et al. | 152/546 |

FOREIGN PATENT DOCUMENTS

| 62-4615 | 1/1987 | Japan | 152/542 |
| 62-157816 | 7/1987 | Japan | 152/542 |
| 6-143949 | 5/1994 | Japan | 152/539 |
| 6-255322 | 9/1994 | Japan | 152/539 |
| 9-66713 | 3/1997 | Japan | 152/539 |
| 2066173 | 7/1981 | United Kingdom . | |
| 2079686 | 1/1982 | United Kingdom . | |

OTHER PUBLICATIONS

Patent Abstracts of Japan, Publication No. JP 08–175131 A, dated Jul. 9, 1996 (Bridgestone Corp).

Patent Abstracts of Japan, Publication No. JP 63–049502 A, dated Mar. 2, 1988 (Sumitomo Rubber Ind Ltd).

*Primary Examiner*—Adrienne C. Johnstone
*Attorney, Agent, or Firm*—Sughrue, Mion, Zinn, Macpeak & Seas, PLLC

[57] ABSTRACT

A pneumatic radial tire includes a carcass ply formed from one radial cord layer, a belt and tread disposed at a crown portion radial direction outer side of the carcass ply, and bead fillers and bead reinforcing layers disposed at the bead portions, wherein the carcass ply is formed from a carcass ply main body extending from one bead portion to another, and carcass ply turn-over portions wound about bead cores and extending toward radial direction outer sides. The bead filler is interposed between the carcass ply main body and the carcass ply turn-over portion, and tapers from directly above the bead core toward a radial direction outer side. The bead reinforcing layer is interposed between the carcass ply main body and the bead filler. An upper end of the bead reinforcing layer extends along the carcass ply main body to a position at 30 to 80% of a tire cross-sectional height, and is disposed further toward a radial direction outer side than an upper end of the bead filler. The bead reinforcing layer is formed from a rubber covered cord layer in which organic fiber cords having a modulus of elasticity of 700 to 1500 kg/mm$^2$ are embedded in parallel in rubber.

5 Claims, 3 Drawing Sheets

PRIOR ART

PNEUMATIC RADIAL TIRE WITH SPECIFIED BEAD REINFORCING LAYER

BACKGROUND OF THE INVENTION

1. Field of the Invention

The present invention relates to a radial tire for passenger vehicles, and in particular, to a bead structure which improves the stability and controllability of a radial tire including a pair of bead cores provided at bead portions, a carcass ply extending in a toroidal shape from one bead portion to the other bead portion and wound about the bead cores and anchored to the bead portions and formed from one radial cord layer, a belt and a tread disposed at a crown portion radial direction outer side of the carcass ply, bead fillers respectively starting from a radial direction outer side of a bead core and tapering toward the outer side, and bead reinforcing layers respectively disposed at a bead portion.

2. Description of the Related Art

A radial tire for passenger vehicles having a carcass ply formed from one radial cord layer is advantageous in that it has a simple structure and is lightweight. However, the rigidity of the bead portions is insufficient, which is disadvantageous with respect to stability and controllability. Therefore, attempts have been made to reinforce the bead portions by various methods such as increasing the volume of the bead fillers and using a rubber having a relatively high hardness (i.e., a rubber having a high JIS A hardness value). However, there are limits as to the extent to which improvements in the bead filler can improve stability and controllability.

In addition, recently further improvements in stability and controllability have been required from the demand for better vehicle performance and for safer driving, and in order to meet the requirements, reinforcing the bead portions, apart from the bead fillers themselves, with organic fibers (e.g., aromatic polyamide fibers, commercial name "KEVLAR" produced by Du pont, referred to herein as aramid), or inorganic fibers such as steel cords or the like have become standard for high performance tires in particular.

Nevertheless, in the case in which the beads are reinforced with steel cord layers, although rigidity is increased, the weight increases, the comfort of the ride deteriorates, and separation occurs at the steel cord ends which is a cause for trouble. In the case in which the aramids having a high cord modulus of elasticity are used as a reinforcing material, the structure is lightweight and has great effects, but is extremely disadvantageous from the point of view of cost.

SUMMARY OF THE INVENTION

An object of the present invention is to provide a pneumatic radial tire in which stability and controllability are improved by reinforcing the bead portions without an accompanying increase in weight, deterioration in the comfort of the ride, or great increase in cost.

In order to achieve the above-described object, the pneumatic radial tire of the present invention comprises: a pair of bead cores provided at bead portions; a carcass ply which extends in a toroidal shape from one bead portion to the other bead portion, and which is wound about the bead cores and anchored to the bead portions, and which is formed from one radial cord layer; a belt and a tread disposed at a crown portion radial direction outer side of the carcass ply; and bead fillers and bead reinforcing layers disposed at the bead portions; wherein the carcass ply is formed from a carcass ply main body which extends from one bead portion to the other bead portion, and carcass ply turn-over portions which are wound about the bead cores and extend to radial direction outer sides; each bead filler is interposed between the carcass ply main body and a carcass ply turn-over portion, and is tapered from directly above a bead core toward a radial direction outer side; each bead reinforcing layer is interposed between the carcass ply main body and a bead filler, and along the carcass ply main body, the upper end of the bead reinforcing layer extends preferably to a position at 30 to 80% of the tire cross-sectional height, and the upper end of the bead reinforcing layer is disposed further toward a radial direction outer side than that of the bead filler; and each bead reinforcing layer is formed from a rubber covered cord layer in which organic fiber cords having a modulus of preferably elasticity of 700 to 1500 kg/mm$^2$ are embedded in parallel in rubber.

If the angle of the cords of the bead reinforcing layer is 30 to 70 degrees with respect to the radial direction, the rigidity of the bead portion increases, and therefore, the improvement in stability and controllability is marked, which is preferable.

When the lower end of the bead reinforcing layer is positioned in the space from directly above the bead core to 5 mm beneath the upper end of the bead filler, the rigidity of the bead portion increases, which is preferable.

Further, the stability and controllability are improved if the bead fillers are formed from a rubber having a JIS A hardness of 70 degrees or more, the upper limit being 100 degrees which is an actual limit in manufacturing.

In accordance with the present invention, stability and controllability are improved by reinforcing the bead portions without an increase in weight, a deterioration in the comfort of the ride or a great increase in costs, by making the structure and arrangement of the bead fillers and the cord reinforcing layers appropriate as described above. The present invention is based on the following knowledge which was obtained from various experiments in order to achieve this object.

(1) It is preferable for the upper end F of a bead filler 6 to be positioned at 20 to 70% of a tire cross-sectional height SH. It is optimal for the JIS A hardness of the rubber forming the bead filler 6 to be 70 or more, the upper limit being 100 in actuality. Note that "tire cross-sectional height SH" is one-half of the difference between the tire outer diameter OD and the rim diameter RD.

(2) A bead reinforcing layer 7 (see FIG. 1) is interposed between a carcass ply main body 81 and the bead filler 6. It will be preferable for the upper end H1 of the bead reinforcing layer 7 to extend along the carcass ply main body 81 to a position at 30 to 80% of the tire cross-sectional height. In accordance with this arrangement, the carcass tension, at the time the tire is filled to standard internal pressure, of the portion along the carcass main body is high. Therefore, for example, an inner surface flexural rigidity can be obtained which is sufficiently greater than that obtained in a case in which the bead reinforcing layer is disposed at the tire axial direction outer side of a carcass turn-over portion 82 which has low carcass tension at the time the tire is filled to standard internal pressure.

By disposing the upper end of the bead reinforcing layer further toward the radial direction outer side than the bead filler upper end and by sufficiently overlapping the lower end of the bead reinforcing layer with the bead filler to 5 mm or more, the inner surface flexural rigidity can be made large. Further, in accordance with the tapering configuration of the bead filler, the difference in rigidity at this portion can be decreased, and therefore, the durability can be improved.

If the angle of the cords of the reinforcing layer is 30 to 70 degrees with respect to the radial direction, the inner surface flexural rigidity of the bead portion can be made even greater. In this way, the stability and controllability can be improved without using expensive aromatic polyamide fiber cords in the reinforcing layer. Further, there is no increase in weight as there is when steel cords having a high modulus of elasticity are used.

The configuration, materials, properties, arrangement and the like of the bead filler 6 and the reinforcing layer 7 should be selected appropriately in accordance with the characteristics required of the tire. For example, in a case in which the stability and controllability are to be greatly improved, H1 should be set to 80% of SH, F should be set to 70% of SH, and H2 should be disposed directly above the bead core (see FIG. 1). Further, the position of the upper end of the carcass turn-over portion 82 may be selected appropriately. However, if durability is to be improved, the upper end of the carcass turn-over portion 82 may preferably be disposed further toward the radial direction outer side than the upper end of the bead reinforcing layer 7 as illustrated in FIG. 3.

DESCRIPTION OF THE PREFERRED EMBODIMENTS

Tires according to embodiments of the present invention and pneumatic radial tires of a conventional example and comparative examples will be described hereinafter with reference to the drawings. The size of each of the tires is 205/65R15.

Figure 1:
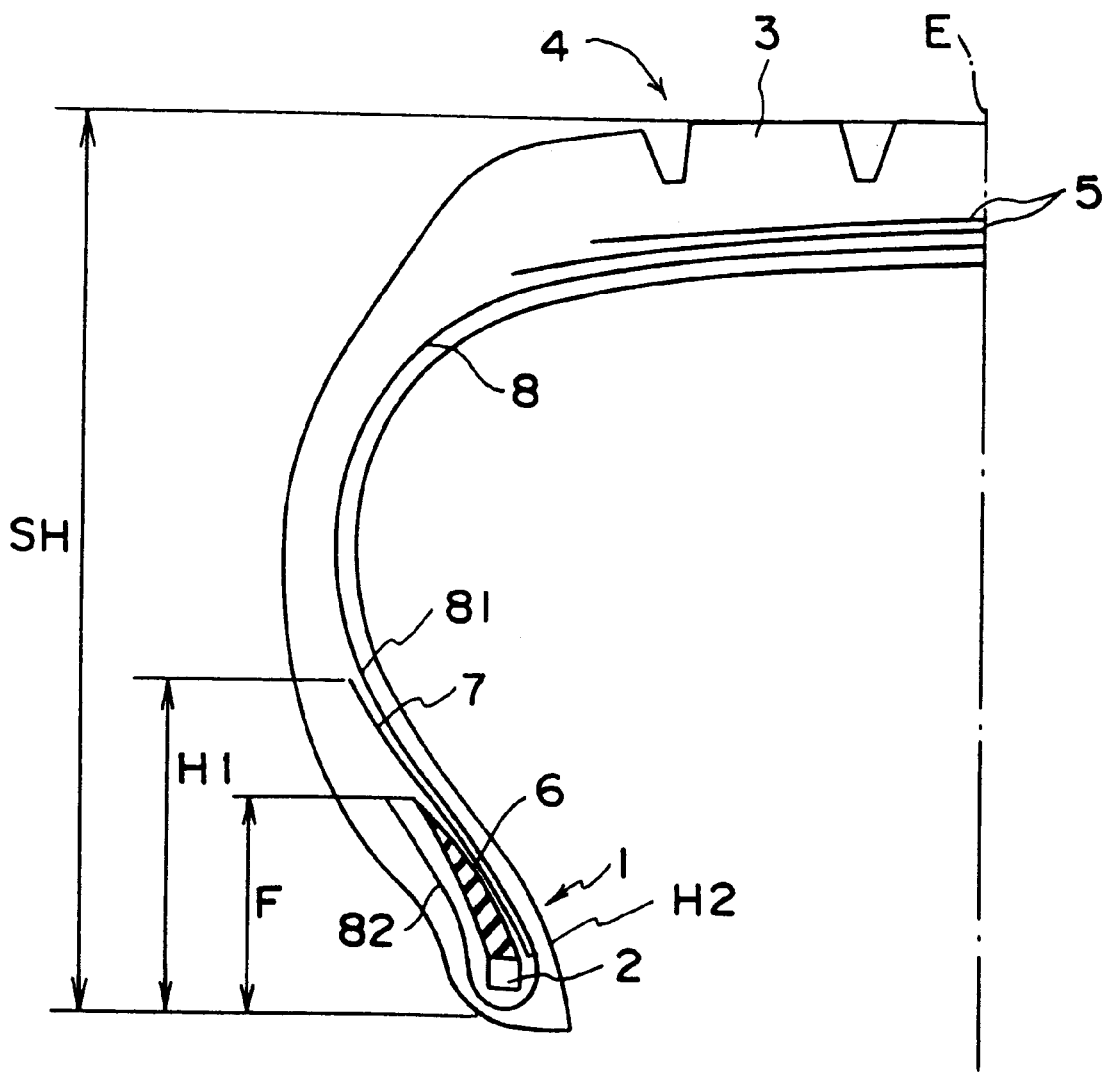
FIG. 1 is a meridian cross-sectional view of a pneumatic radial tire according to the present invention.

FIG. 1 illustrates the structure of a bead portion of a tire of Examples 1 through 3 of the present invention and Comparative Examples 2 through 5. In FIG. 1, reference numeral 1 is a bead portion, 2 is a bead core, 3 is a tread, 4 is a radial tire, 5 are belts, 6 is a bead filler, 7 is a bead reinforcing layer, 8 is a carcass ply, 81 is a carcass ply main body, 82 is a carcass turn-over portion, and E is the equatorial line.

Figure 2:
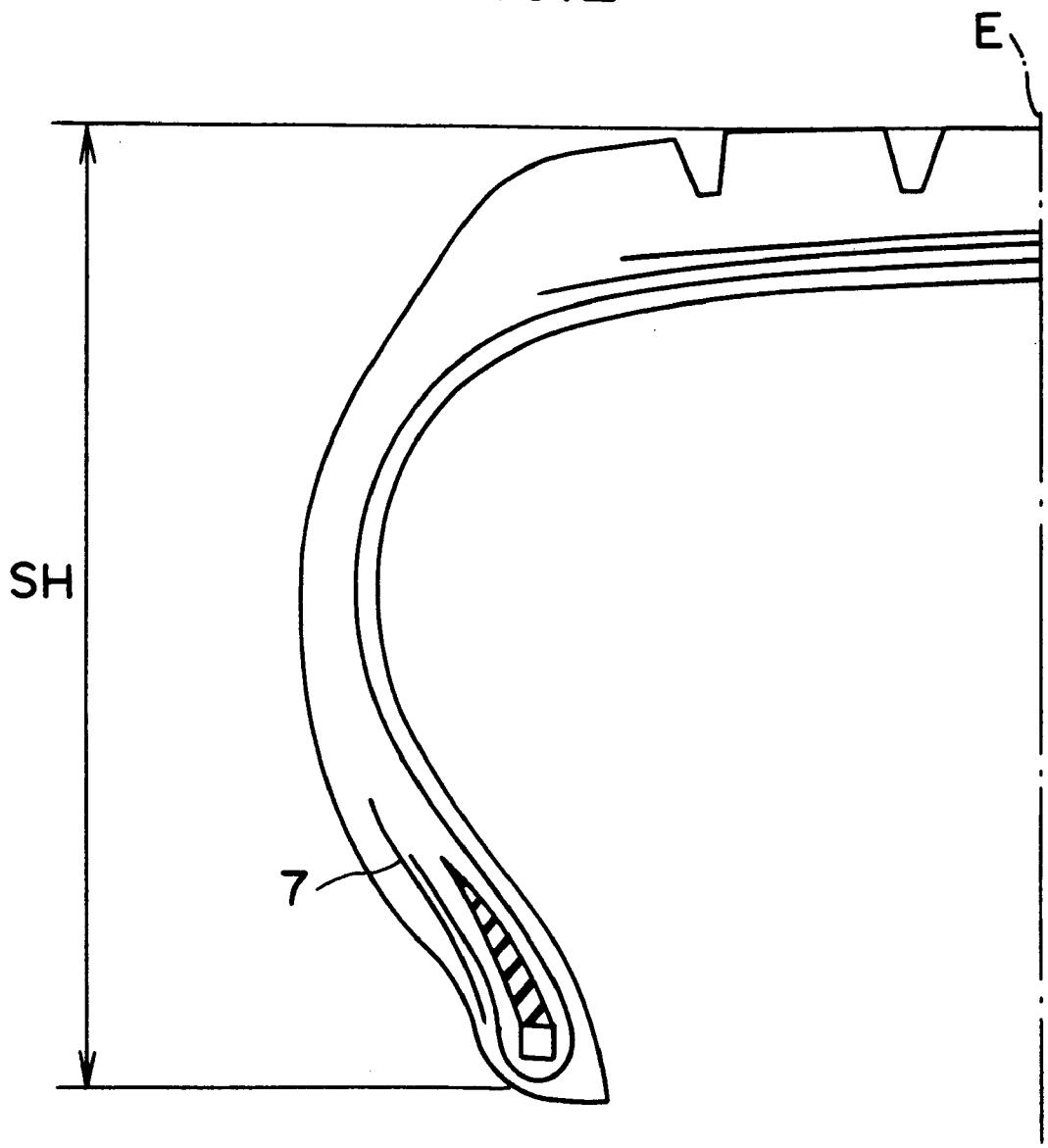
FIG. 2 is a meridian cross-sectional view of a pneumatic tire of a conventional example.

FIG. 2 illustrates the bead structure of Comparative Example 1. The difference between the structure of FIG. 1 and that of FIG. 2 is that in FIG. 2, the bead reinforcing layer is disposed at the tire axial direction outer side of the bead filler 6.

Figure 3:
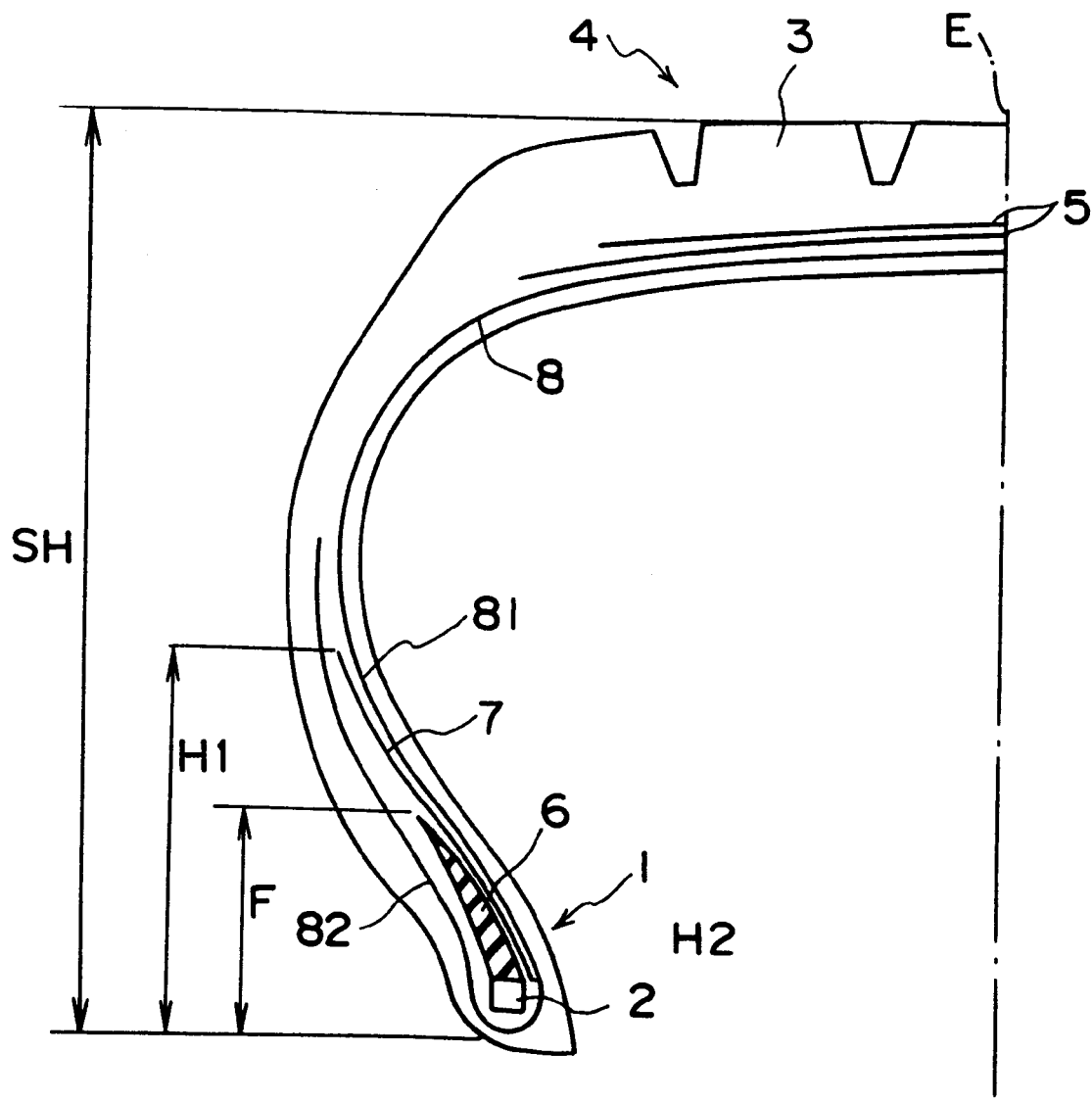
FIG. 3 is a meridian cross-sectional view of a pneumatic tire according to another embodiment of the present invention.

FIG. 3 illustrates the structure of a bead portion of tires of Examples 4 through 6.

In FIGS. 1 and 3, the lower end of the bead reinforcing layer is shown as being positioned right above the upper end of the bead core. However, the lower end of the bead reinforcing layer may be positioned anywhere in a range from the upper end of the bead core to 5 mm beneath the upper end of the bead filler.

The specifications of the Comparative Examples and the Examples are listed in Table 1, and the features thereof are described hereinafter.

The bead reinforcing layer of the tire of Comparative Example 2 uses aromatic polyamide fibers (aramid) of a cord modulus of elasticity of 2000 kg/mm$^2$. The bead reinforcing layer of the tire of Example 3 uses polyethylene-2,6-naphthalate fibers (abbreviated "PEN") of a cord modulus of elasticity of 1400 kg/mm$^2$. Polyester cords (abbreviated "PET") of a cord modulus of elasticity of 800 kg/mm$^2$ are used as the bead reinforcing layers of the other tires.

The upper end of the carcass turn-over portion 82 of the tires of Examples 4 through 6 is disposed further toward the radial direction outer side than the upper end of the bead reinforcing layer 7.

In order to confirm the effects of the present invention, tires according to Table 1 were inflated to an internal pressure of 2.0 kg/cm$^2$, were mounted to 6½Jx15 rims, were set on a drum tester under 490 kgf load, and the cornering power thereof was measured. The cornering power is the cornering force per one degree slip angle. The average values until a slip angle of 7 degrees are expressed as indices with 100 being the value of the conventional tire, and are listed in Table 1. Here, higher values indicate better cornering power.

TABLE 1

|  | Bead Filler | | Bead Reinforcing Layer | | | Arrangement | Cornering Power |
|---|---|---|---|---|---|---|---|
|  | Hardness | F | Angle | Cord Type | H1 | | |
| Conventional Example | 90 | 25% | — | — | — | — | 100 |
| Comp. Ex. 1 | 90 | 25% | 45° | PET | 35% | FIG. 2 | 103 |
| Comp. Ex. 2 | 90 | 25% | 45° | aramid | 35% | FIG. 1 | 115 |
| Comp. Ex. 3 | 65 | 25% | 45° | PET | 35% | FIG. 1 | 103 |
| Comp. Ex. 4 | 90 | 15% | 45° | PET | 35% | FIG. 1 | 105 |
| Comp. Ex. 5 | 90 | 15% | 45° | PET | 25% | FIG. 1 | 101 |
| Ex. 1 | 90 | 25% | 45° | PET | 35% | FIG. 1 | 110 |
| Ex. 2 | 90 | 40% | 45° | PET | 50% | FIG. 1 | 120 |
| Ex. 3 | 90 | 25% | 45° | PEN | 35% | FIG. 1 | 113 |
| Ex. 4 | 90 | 25% | 45° | PET | 35% | FIG. 3 | 112 |
| Ex. 5 | 90 | 40% | 45° | PET | 50% | FIG. 3 | 122 |
| Ex. 6 | 90 | 65% | 45° | PET | 75% | FIG. 3 | 130 |

From the above results of evaluation, it can be seen that the tires of Examples 1 through 5 have improved cornering power over the tire of the conventional example, and exhibit a substantially equivalent performance as the tire having a bead reinforcing layer using aromatic polyamide fibers.

What is claimed is:

1. A radial tire comprising:

a pair of bead cores, one of the bead cores being provided at a left bead portion and the other of the bead cores being provided at a right bead portion;

a carcass ply extending in a toroidal shape between the bead portions, and being formed from one radial cord layer which is wound about the pair of bead cores and anchored to the bead portions;

a belt and a tread disposed at a crown portion radial direction outer side of the carcass ply; and a bead filler and a bead reinforcing layer disposed at each of the bead portions, wherein the carcass ply is formed from a carcass ply main body extending from one bead portion to the other bead portion, and carcass ply turn-over portions each of which is wound about a bead core and extends toward a radial direction outer side, the bead filler is interposed between the carcass ply main body and a carcass ply turn-over portion, and is tapered from directly above the bead core toward a radial direction outer side, the bead reinforcing layer is interposed between the carcass ply main body and a bead filler, and along the carcass main body, an upper end of the bead reinforcing layer extends to a position at 30 to 80% of a tire cross-sectional height, and the upper end of the bead reinforcing layer is disposed further toward a radial direction outer side than an upper end of the bead filler, the bead reinforcing layer is formed from a rubber covered cord layer in which organic fiber cords having a modulus of elasticity of 700 to 1500 kg/mm$^2$ are embedded in parallel in rubber, and an upper end of the carcass ply turn-over portion is disposed further toward a radial direction outer side than an upper end of the bead reinforcing layer.

2. A radial tire according to claim 1, wherein an angle of cords of the bead reinforcing layer is 30 to 70 degrees with respect to a radial direction.

3. A radial tire according to claim 1, wherein a lower end of the bead reinforcing layer is disposed in a range from directly above the bead core to 5 mm beneath an upper end of the bead filler.

4. A radial tire according to claim 1, wherein an upper end of the bead filler is disposed so as to extend to a position at 20 to 70% of a tire cross-sectional height.

5. A radial tire according to claim 1, wherein the bead filler is formed of a rubber having a JIS A hardness of 70 to 100 degrees.

* * * * *